US006896364B2

(12) United States Patent
Nakazawa et al.

(10) Patent No.: US 6,896,364 B2
(45) Date of Patent: May 24, 2005

(54) INKJET RECORDING MEDIUM

(75) Inventors: Masayuki Nakazawa, Hachioji (JP); Akira Yamano, Hino (JP)

(73) Assignee: Konica Corporation, Tokyo (JP)

( * ) Notice: Subject to any disclaimer, the term of this patent is extended or adjusted under 35 U.S.C. 154(b) by 48 days.

(21) Appl. No.: 10/623,892

(22) Filed: Jul. 21, 2003

(65) Prior Publication Data

US 2004/0207709 A1 Oct. 21, 2004

(30) Foreign Application Priority Data

Jul. 26, 2002 (JP) ....................................... 2002-218409

(51) Int. Cl.$^7$ ............................... B41J 2/01; B32B 3/00
(52) U.S. Cl. ....................... 347/105; 347/101; 428/32.1
(58) Field of Search ................................. 347/105, 101, 347/106; 428/32.1, 195; 524/306, 308, 315, 317

(56) References Cited

U.S. PATENT DOCUMENTS 6,391,954 B2 * 5/2002 Azizi et al. ................. 524/306
6,474,807 B1 * 11/2002 Honda ........................ 347/106
6,613,419 B2 * 9/2003 Ohbayashi et al. ...... 428/195.1
2003/0175450 A1 * 9/2003 Obayashi et al. .......... 428/32.1

* cited by examiner

*Primary Examiner*—Manish Shah
(74) *Attorney, Agent, or Firm*—Squire, Sanders & Dempsey

(57) ABSTRACT

There is described an inkjet recording medium that can display image suitable for observation without employing wet development processing. The recording medium is substantially transparent and includes a supporting base shaped in a sheet; and an ink-absorbing layer that is formed on at least one of both sides of the supporting base, and that absorbs ink particles so as to form the image. The diffuse transmission density of a first area, being a part of the recording medium on which no image is formed, is in a range of 0.45–0.15, and a Q-factor of the first area is in a range of 1.50–1.00; and the recording medium is so constituted that a Q-factor of a second area, being a part of the recording medium on which an image is formed so as to adjust a diffuse transmission density at 1.00, is in a range of 1.20–1.00.

20 Claims, 3 Drawing Sheets

INKJET RECORDING MEDIUM

BACKGROUND OF THE INVENTION

The present invention relates to a transparent ink-jet recording medium for recording images by an inkjet system.

In the past, in order to record and diagnose a digital medical image, the image used to be recorded on a wet silver-salt film by wet development processing. Because the wet development requires tap water piping and others for processing, installation of a processing place is limited. Besides, the processing itself is not friendly to the environment because it discharges waste water.

Because of the above, so called dry silver-salt recording method has been developed, where image information is recorded as a latent image by light such as laser and then the image is developed by heating or the image information is recorded by heat, using thermal head. Thus, a recording method or recording device that does not require wet development processing is becoming popular.

However, although an image obtained by a recording method or recording device that does not require wet development processing was good for medical diagnosis, but does not always satisfy doctors' requirements in every respect. The inventor of the present invention has examined possible reasons for dissatisfaction and found several factors.

The first factor is that an image appears differently depending upon the light diffusion condition of the light source used for observation.

Generally, when a medical image is recorded on a recording medium and then diagnosed, using a light box (for example, film view) that is made of a fluorescent light, serving as the light source, covered with a diffusion plate, the recording medium is set on the diffusion plate of the light box and transmitted image is observed. That is, an observer observes the image under diffused light. If the condition of the light diffused by the light box is perfect diffused light, visual transmission density corresponds to diffuse transmission density. However, because the light diffused by the light box is not always ideal and perfect diffused light, the transmission density to be sensed visually is consequently a value between the diffuse transmission density and parallel transmission density. The condition of the light diffused by each light box differs from one to another and the light transmitted through each light box differs in the ratio of the diffused components to transmitted components. Because of this, what value between the diffuse transmission density and parallel transmission density is visually sensed as the image density depends upon each light box and so the image cannot be displayed in stable image quality.

Besides, if the relationship between the diffuse transmission density and parallel transmission density of a recorded image varies tremendously by image density, the ratio of the diffused components to transmitted components in the transmitted light to be observed on a light box becomes different by density. Because of the above, even if the diffuse transmission density of a test image for density gradation correction is measured and the density gradation characteristic is adjusted according to the measurement result, images cannot always be seen as intended depending upon the condition of the light diffused by the light box.

The second factor is that the recording medium fogs depending upon the light diffusion of the medium, particularly that of the medium on which no image is recorded.

Because the non-image portion (portion on which no image is recorded) of a recording medium used in the dry silver-salt recording method has higher degree of light diffusion and accordingly looks very foggy, the low-density portion of an image cannot be observed smoothly.

SUMMARY OF THE INVENTION

To overcome the abovementioned drawbacks in conventional recording mediums, it is an object of the present invention to provide an inkjet recording medium that can display image suitable for observation without employing wet development processing.

Accordingly, to overcome the cited shortcomings, the abovementioned object of the present invention can be attained by recording mediums and medical image recording methods described as follow.

(1) A recording medium, being substantially transparent, for recording an image through image-forming processes employing an ink-jetting method, comprising: a supporting base shaped in a sheet; and an ink-absorbing layer that is formed on at least one of both sides of the supporting base, and that absorbs ink particles so as to form the image; wherein a diffuse transmission density of a first area, being a part of the recording medium on which no image is formed, is in a range of 0.45–0.15, and a Q-factor of the first area is in a range of 1.50–1.00; and wherein the recording medium is so constituted that a Q-factor of a second area, being a part of the recording medium on which an image is formed so as to adjust a diffuse transmission density at 1.00, is in a range of 1.20–1.00.

(2) The recording medium of item 1, wherein the supporting base is made of a resin material.

(3) The recording medium of item 1, wherein the recording medium is so constituted that a Q-factor of a third area, being a part of the recording medium on which an image is formed so as to adjust a diffuse transmission density at a value smaller than 1.00 and greater than the diffuse transmission density of the first area, is in a range of 1.50–1.00.

(4) The recording medium of item 1, wherein the recording medium is so constituted that the Q-factor of the first area is in a range of 1.30–1.00.

(5) The recording medium of item 4, wherein the recording medium is so constituted that a Q-factor of a third area, being a part of the recording medium on which an image is formed so as to adjust a diffuse transmission density at a value smaller than 1.00 and greater than the diffuse transmission density of the first area, is in a range of 1.30–1.00.

(6) The recording medium of item 1, wherein a haze of the first area is in a range of 15%–5%.

(7) The recording medium of item 1, wherein a psychological hue angle, denoted by hab and defined in the CIE•LAB color system by an equation of $$hab=\tan^{-1}(b^*/a^*),$$

is in a range of 250°–230°, when light, emitted from a fluorescent light-source, transmit through the first area, and wherein a value of $(a^{*2}+b^{*2})^{0.5}$ is in a range of 22–15.

(8) The recording medium of item 1, wherein the ink-absorbing layer is an air-gap type ink-absorbing layer, mainly composed of a high-polymer binder, inorganic micro-particles and/or organic micro-particles.

(9) The recording medium of item 8, wherein an average particle-diameter of the inorganic micro-particles and/or the organic micro-particles before condensing them is equal to or smaller than 15 nm.

(10) The recording medium of item 1, wherein a thickness of the ink-absorbing layer is in a range of 50 μm–20 μm.

(11) The recording medium of item 1, wherein the ink-jetting method employs three kinds of black inks, densities of which are different relative to each other, so as to record a medical image.

(12) A method for recording a medical image onto a recording medium, being substantially transparent, which comprises a supporting base shaped in a sheet and an ink-absorbing layer, formed on at least one of both sides of the supporting base and absorbing ink particles so as to form the medical image, the method comprising the step of: forming the medical image onto the recording medium through image-forming processes employing an ink-jetting method; wherein a diffuse transmission density of a first area, being a part of the recording medium on which no image is formed, is in a range of 0.45–0.15, and a Q-factor of the first area is in a range of 1.50–1.00; and wherein the recording medium is so constituted that a Q-factor of a second area, being a part of the recording medium on which an image is formed so as to adjust a diffuse transmission density at 1.00, is in a range of 1.20–1.00.

(13) The method of item 12, wherein the ink-jetting method employs three kinds of black inks, densities of which are different relative to each other, so as to record the medical image.

(14) The method of item 12, wherein the supporting base is made of a resin material.

(15) The method of item 12, wherein the recording medium is so constituted that a Q-factor of a third area, being a part of the recording medium on which an image is formed so as to adjust a diffuse transmission density at a value smaller than 1.00 and greater than the diffuse transmission density of the first area, is in a range of 1.50–1.00.

(16) The method of item 12, wherein the Q-factor of the first area is in a range of 1.30–1.00.

(17) The method of item 16, wherein the recording medium is so constituted that a Q-factor of a third area, being a part of the recording medium on which an image is formed so as to adjust a diffuse transmission density at a value smaller than 1.00 and greater than the diffuse transmission density of the first area, is in a range of 1.30–1.00.

(18) The method of item 12, wherein a haze of the first area is in a range of 15%–5%.

(19) The method of item 12, wherein a psychological hue angle, denoted by hab and defined in the CIE•LAB color system by an equation of $$hab=\tan^{-1}(b^*/a^*),$$

is in a range of 250°–230°, when light, emitted from a fluorescent light-source, transmit through the first area, and wherein a value of $(a^{*2}+b^{*2})^{0.5}$ is in a range of 22–15.

(20) The method of item 12, wherein a thickness of the ink-absorbing layer is in a range of 50 μm–20 μm.

Further, to overcome the abovementioned problems, other image-recording apparatus, embodied in the present invention, will be described as follow:

(21) A transparent ink-jet recording medium, for recording an image formed by an ink-jetting method, characterized in that the transparent ink-jet recording medium is provided with a sheet-type supporting base made of a resin material, and an ink-absorbing layer that is formed on at least one of both sides of the supporting base and that absorbs ink so as to form the image, and a diffuse transmission density of a non-image portion, on which no image is formed, is in a range of 0.45–0.15, and a Q-factor of the non-image portion is in a range of 1.50–1.00, and a Q-factor of an image-formed portion, on which an image is so formed that the diffuse transmission density is 1.00, is in a range of 1.20–1.00.

The inventor has noticed that, by utilizing the ink-jet system, images can be generated and recorded on a recording medium without wet development processing. Then, the inventor has run various trial-and-error experiments for eliminating the problems that the displayed image becomes unstable because of the difference in the diffusion condition of the light source for observation and that the recording medium become foggy depending upon the degree of light diffusion so that the displayed image can be observed smoothly. At last, it is found that yellowish fogging due to light diffusion can be eliminated if the diffuse transmission density of the non-image portion, on which no image is formed, is in a range from 0.15 to 0.45, both inclusive, and, at the same time, the Q factor of the non-image portion is in a range from 1.00 to 1.50, both inclusive. It is also found that, if the Q factor of the medium, on which an image is so formed that the diffuse transmission density is 1.00, is in a range from 1.00 to 1.20, the image can be displayed in a stable density gradation irrespective of the diffusion condition of the light source for observation.

That is to say, according to the invention described in item 21, yellowish fogging due to light diffusion can be eliminated and even a portion of the image that has lower image density after being generated can be displayed in favorable tone, and also the image can be displayed in a stable density gradation irrespective of the diffusion condition of the light source for observation. As a result, images suitable for observation can be displayed without wet development processing.

(22) The ink-jet recording medium, described in item 21, characterized in that a Q factor of an image-formed portion, on which an image is formed so that the diffuse transmission density falls within a range from the diffuse transmission density of the non-image portion to 1.00, exclusive, is in a range from 1.00 to 1.50, both inclusive.

According to the invention described in item 22, because the Q factor of the image portion, on which the image is formed so that the diffuse transmission density falls within a range from the diffuse transmission density of the non-image portion to 1.00, exclusive, is in a range from 1.00 to 1.50, both inclusive, images more suitable for observation can be displayed.

(23) A transparent ink-jet recording medium, for recording an image formed by an ink-jetting method, characterized in that a diffuse transmission density of a non-image portion, on which no image is formed, is in a range of 0.45–0.15, and a Q-factor of the non-image portion is in a range of 1.30–1.00, and a Q-factor of an image-formed portion, on which an image is so formed that the diffuse transmission density is 1.00, is in a range of 1.20–1.00.

According to the invention described in item 23, because the upper limit of the Q factor of the non-image portion is 1.30, inclusive, yellowish fogging can be better eliminated than on an image with the upper limit of 1.50, inclusive.

(24) The ink-jet recording medium, described in item 23, characterized in that a Q factor of an image-formed portion, on which image is formed so that the diffuse transmission density falls within a range from the diffuse transmission density of the non-image portion to 1.00, exclusive, is in a range from 1.00 to 1.30, both inclusive.

According to the invention described in item 24, because the Q factor of the image-formed portion, on which image is formed so that the diffuse transmission density falls within a range from the diffuse transmission density of the non-image portion to 1.00, exclusive, is in a range from 1.00 to 1.30, both inclusive, images more suitable for observation can be displayed.

(25) The ink-jet recording medium, described in anyone of items 21–24, characterized in that a haze of the non-image portion is in a range from 5% to 15%, both inclusive.

The inventor has found in the course of the above experiments that, if the haze of the non-image portion is in a range from 5% to 15%, both inclusive, light shadow in low-density portions on an image after being generated can be observed smoothly.

That is, according to the invention described in claim 5, light shadow can be observed smoothly even in low-density portions and hence diagnostic capability improves.

(26) The ink-jet recording medium, described in anyone of items 21–25, characterized in that hab (a psychological hue angle: $hab=\tan^{-1}(b^*/a^*)$ defined in the CIE•LAB color system) is in a range of 250°–230°, both inclusive, when light, emitted from a fluorescent light-source, transmit through the non-image portion, and a value of $(a^{*2}+b^{*2})^{0.5}$ is in a range of 22–15, both inclusive.

According to the invention described in item 26, because the hab is in a range from 230 degrees to 250 degrees, both inclusive, and $(a^{*2}+b^{*2})^{0.5}$ is in a range from 15 to 22, both inclusive, images can be displayed in color tone that does not cause fatigue to eyes.

(27) The ink-jet recording medium, described in anyone of items 21–26, characterized in that the ink absorbing layer is of a void type mainly comprising inorganic and/or organic particles and high-polymer binder.

According to the invention described in item 27, because the ink absorbing layer is of a void type mainly comprising inorganic and/or organic particles and high-polymer binder, deposited ink can be well absorbed.

(28) The ink-jet recording medium, described in item 27, characterized in that the average particle size of the inorganic and/or organic particles before agglomeration is 15 nm or less.

According to the invention described in item 28, if the average particle size of the inorganic and/or organic particles before agglomeration is 15 nm or less, the haze or Q factor can be reduced easily and so the image can be smoothly generated so that the haze or Q factor falls within the above range.

(29) The ink-jet recording medium, described in anyone of items 21–28, characterized in that a thickness of the ink absorbing layer is more than 20 μm, inclusive, and less than 50 μm, inclusive.

It is preferable that the thickness of the ink absorbing layer is more than 20 μm, inclusive, because the Q factor can be made to fall within the above range in generating the image. Besides, it is also preferable that the thickness of the ink absorbing layer is less than 50 μm, inclusive, because the ink absorbing layer becomes hard to break.

That is to say, according to the invention described in item 29, because the thickness of the ink absorbing layer is in a range from 20 to 50 μm, both inclusive, breakage of the ink absorption head is prevented and the Q factor can be made to easily fall within the above range in generating the image.

(30) The ink-jet recording medium, described in anyone of items 21–29, characterized in that the inkjet recording medium is used in an ink-jet recording method that records medical images using three or more black inks with different density.

With the invention described in item 30, since the inkjet recording medium is used in an inkjet recording method that records medical images using three or more black inks with different density, fine images can be generated without exhibiting granular touch.

(31) An ink-jet recording method, characterized in that a medical image is formed onto the recording medium, described in anyone of items 21–29, by an ink-jetting method.

According to the invention described in item 31, the same effect as in any one of the items 21 to 29 can be produced.

(32) The ink-jet recording method, described in item 31, characterized in that the medical image is formed and recorded by employing three or more black inks with different density.

With the invention described in item 32, the same effect as in item 30 can be produced.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENTS

Figure 1:
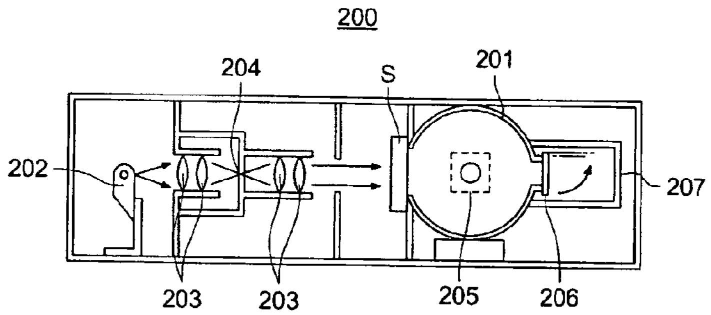
FIG. 1 shows a side cross-sectional view of the integrating sphere type light transmission factor measuring device for measuring the total light transmission factor and diffuse transmission factor of the recording medium according to an embodiment of the invention.

Detailed description of the preferred embodiments of the present invention is given hereunder, using figures. The invention is not limited to the concrete constructions, operations and values described in each embodiment below.

On the transparent recording medium (inkjet recording medium) used in this embodiment, a monochrome image is depicted with liquid ink jetted out by an inkjet system.

The recording medium is a sheet with an area of practically 15 by 10 cm or more, four corners being cut round, and comprises a supporting base made of light transmission resin of 75 to 250 $\mu$m thick and an ink absorbing layer, formed at least on one side of the supporting base, for absorbing and recording an image. If the thickness is less than 75 $\mu$m, the medium is hard to handle because the sheet sags down and, on the contrary, if it is more than 250 $\mu$m, its fairly heavy weight results in disadvantage in bringing a pile of the sheets.

In the meantime, it is possible to depict a color image on this recording medium and the shape of the medium may not necessarily be as specified above but can be varied accordingly so as to match with an image to be depicted or correspond to an image recording device.

Besides, it is preferable to provide a marking (for example, notch) on the recording medium so that the surface and rear of the sheet can easily be recognized. With this marking, even when a lot of recording medium need to be handled in a short time, the surface and rear of each sheet can be judged easily and the films can be handled efficiently.

Materials applicable to transparent supporting base are polyester type such as polyethylene-terephthalate (PET), cellulose ester type such as nitro cellulose and cellulose acetate, and besides, polysulfone, polyimide, and polycarbonate. The sheet recording medium shall preferably be colored blue.

The surface of the supporting base on which the ink absorbing layer is to be provided has been subjected to a corona discharge treatment, flame treatment or UV ray irradiation treatment so as to improve adhesion with the ink absorbing layer.

If the ink absorbing layer is to be provided only on one side of the supporting base, gelatin or water-soluble resin is applied to the other side for preventing the sheet from curling. Besides, it is also allowable to provide the other side of the supporting base with an antistatic treatment, coloring, or mat treatment, by which mat particles having average particle size of 5 to 100 $\mu$m are dispersed on the surface for preventing adhesion with other recording medium, or add metallic oxide particles such as titanium oxide particle and lead oxide particle.

The supporting base is preferably colored blue, and dye used for coloring is preferably one with the absorption maximum of 570 to 700 $\mu$m. That is, one with required absorption maximum can be selected, for example, out of anthraxquinone type, azo type, azomethine type, indoaniline type, oxonole type, triphenyl-methane type, carbocyanine type, and styryl type dyes. Dye may be mixed directly so as to be contained in the supporting base or solid hydrophobic dye may be dispersed so as to be contained in the back layer, or hydrophobic dye may be dispersed into liquid, using high-boiling-point solvent and/or low-boiling-point solvent, and the liquid be used.

Concrete examples of dyes preferably applicable to this embodiment are shown in No. 1 to No. 9 below, but not limited thereto.

[Chemical Formula 1]

No. 1

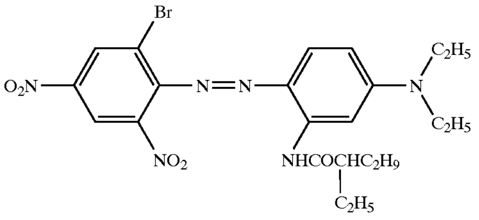

No. 2

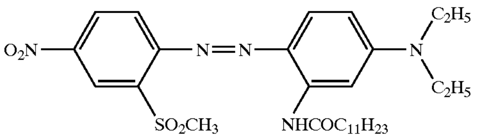

No. 3

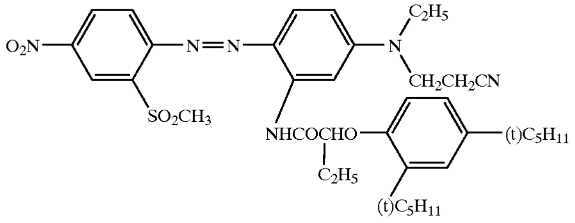

No. 4

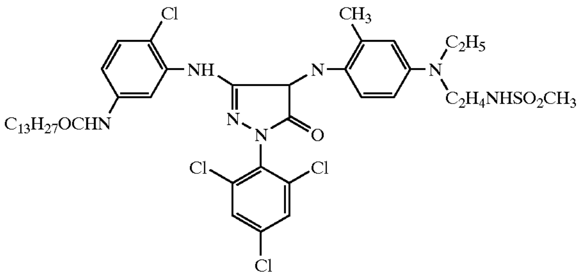

No. 5

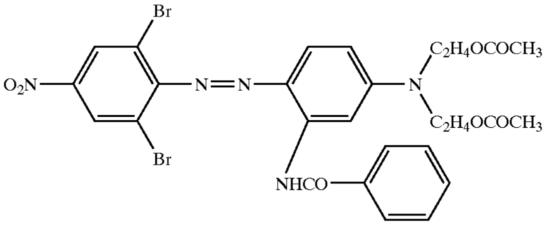

[Chemical Formula 2]

No. 6

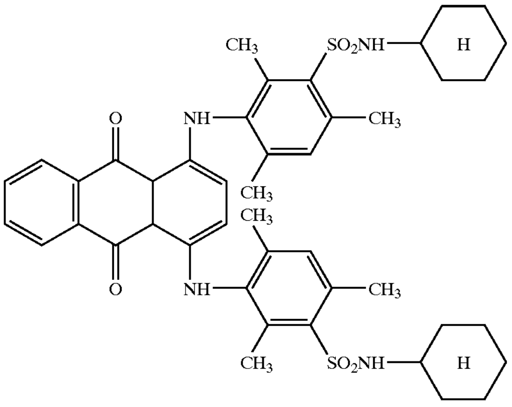

-continued

No. 7

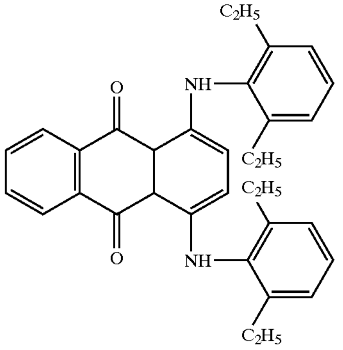

No. 8

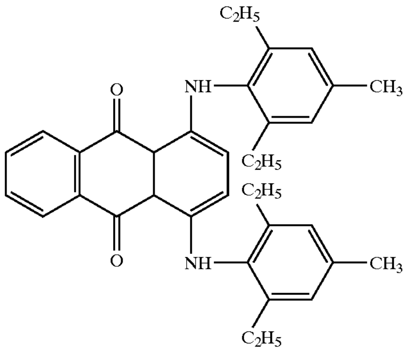

No. 9

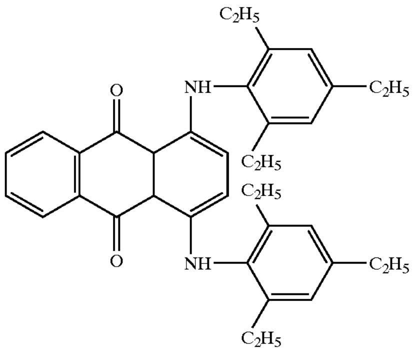

The ink absorbing layer is a void type layer of three-dimensional mesh structure having the percentage of voids of 40% to 90%, and mat particles having the average particle size of 5 to 100 $\mu$m are dispersed on the surface to prevent adhesion with other recording medium.

The void type ink absorbing layer is mainly made of inorganic particles (such as silica particles) and/or organic particles and high-polymer binder (for example, water-soluble resin) so that the film thickness is in a range from 20 to 50 $\mu$m, both inclusive. It is acceptable to add, or apply to the surface, surface active agent as antistatic agent.

The average primary particle size of inorganic particles and/or organic particles (average size of each particle before agglomeration) is preferably less than 15 nm, inclusive, and further preferably less than 8 nm, inclusive, in this embodiment. Average particle size can be measured in a general manner. In this embodiment, photo is taken by a transmission type electronic microscope, the number of particles (n) observed per unit visual field on the photo and their particle sizes (diameter $X_i$) are measured, and then the average particle size is obtained using the formula below. (In the formula, $X_i$ represents the diameter of the i-th particle).

[Formula 1]

$$X = \frac{\sum_{i=1}^{n} Xi}{n}$$

Besides, the mass ratio of the inorganic particle and/or organic particle to the water-soluble resin is preferably within a range of 1.2:1 to 12.1:1.

The voids of the three-dimensional mesh structure in the ink absorbing layer consist of multiple pores. The multiple cores preferably have an average diameter of 4 to 40 nm and the pore capacity is 0.3 to 1.0 ml/g. The specific surface area of the ink absorbing layer is preferably 50 to 500 $m^2/g$. Since the ink absorbing layer is of a void type that can efficiently absorb inks deposited on the recording medium.

It is preferable that silica particles are of silicic acid, having two to three silarol groups per surface area 1 $nm^2$, and that the three-dimensional mesh structure is made of chains that are formed by the coupling of secondary particles, having a size of 10 to 100 nm, of the aggregated silica particles.

Incidentally, applicable particles include, for example, colloidal silica, potassium silicate, zeolite, kaolinite, halloysite, muscovite, talc, calcium carbonate, calcium sulfate, and aluminum oxide.

Water-soluble resin shall preferably be polyvinyl alcohol, but gelatin or one disclosed in the Japanese Application Patent Laid-open Publication No. HEI 7-276789 (1995) is also applicable.

The recording medium of this embodiment is so constructed that the diffuse transmission density of the non-image portion, on which no image is generated, is in a range from 0.15 to 0.45, both inclusive, and, at the same time, the Q factor of the non-image portion is in a range from 1.00 to 1.50, both inclusive or preferably in a range from 1.00 to 1.30, both inclusive. At the same time, the recording medium is so constructed that the Q factor of the medium, on which an image is so generated that the diffuse transmission density is 1.00, is in a range from 1.00 to 1.20.

Besides, it is further preferable that the recording medium is so constructed that the Q factor of the image portion, on which image is generated so that the diffuse transmission density falls within a range from the diffuse transmission density of the non-image portion to 1.00, exclusive, is in a range from 1.00 to 1.50, both inclusive, (or preferable to 1.30, inclusive).

To be concrete, in forming the recording medium, for example, coloring of the supporting base and/or coloring and thickness of the ink absorbing layer is determined so that the diffuse transmission density and Q factor fall within the above range.

Since the recording medium is so constructed that the diffuse transmission density and Q factor fall within the above range as explained above, yellowish fogging due to light diffusion can be eliminated and even a portion of the image that has lower image density after being generated can be displayed in favorable tone, and also the image can be displayed in a stable density gradation irrespective of the diffusion condition of the light source for observation. As a result, images suitable for observation can be displayed without wet development processing.

Besides, it is preferable to construct the recording medium so that the haze of the non-image portion is in a range from 5% to 15%, both inclusive. With this, light shadow can be observed smoothly even in low-density portions and hence diagnostic capability improves.

The diffuse transmission density, Q factor and haze of the recording medium can be adjusted not only by varying the coloring and thickness as above but also by selecting different material for the ink absorbing layer. Besides, even if the same material is used, the Q factor and haze can be varied through different forming process of the ink absorbing layer. For example, defoaming in the preparation process of the coating liquid of the ink absorbing layer is very important. That is, if foams in the coating liquid are removed by sufficient vacuuming in the course of dispersion or filtration after dispersion, the Q factor and haze can be adjusted to a desirous level.

The diffuse transmission factor and Q factor of the recording medium is calculated based on the total light transmission factor, diffuse transmission factor and parallel light transmission factor obtained through a measuring method specified in JIS K7105-1981.

To measure the total light transmission factor, diffuse transmission factor and parallel light transmission factor, JIS specifies two measuring methods: method A and method B. Since the inkjet recording medium used in this embodiment is thinner than 1/10 the inside diameter of the opening of the integrating sphere (to be explained later), the measuring method A is employed.

According to the measuring method A, the total light transmission factor and diffuse transmission factor are measured by an integrating sphere type light transmission factor measuring device shown in FIG. 1. The integrating sphere type light transmission factor measuring device 200 is equipped with an integrating sphere 201; the light from a light source 202 emitting standard light A is directed through a lens 203 and a diaphragm 204 and then irradiated on a test specimen S; the light transmitted through the test specimen S is collected onto a light receptor 205 by the integrating sphere; and the light receptor 205 measures the light transmitted through the test specimen S.

Figure 2:
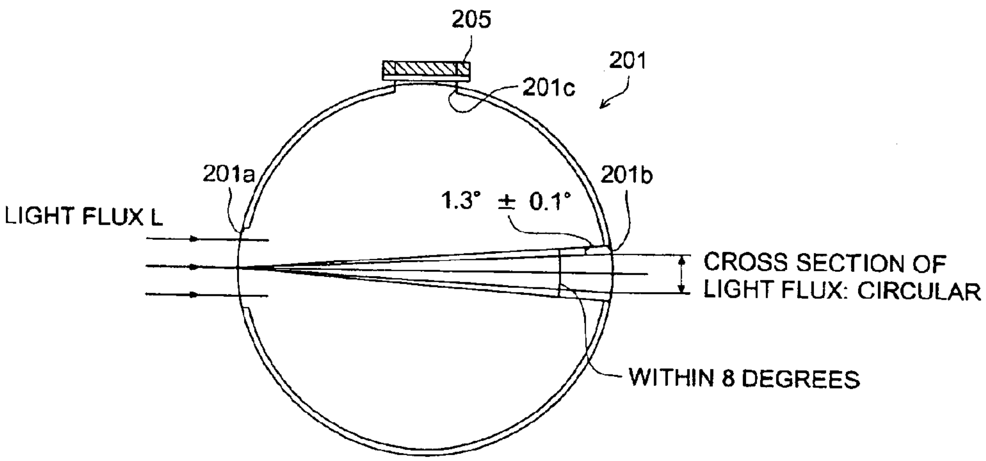
FIG. 2 shows a side cross-sectional view of the integrating sphere installed on the integrating sphere type light transmission factor measuring device shown in FIG. 1.

The integrating sphere 201 is of approximately spherical shape which is empty, as shown in FIG. 2, and of which inside surface is made to reflect light. The integrating sphere is equipped with a circular inlet opening 201*a*, on which the test specimen S is mounted and from which the light transmitted through the test specimen S enters, a circular outlet opening 201*b* opposed to the inlet opening 201*a*, and a light receptor opening 201 on which the light receptor 205 is mounted. The sum (a+b+c) of area a of the inlet opening 201*a*, area b of the outlet opening 201*b* and area c of the light receptor opening 201*c* shall be less than 4%, inclusive, of the inside surface area of the sphere. Besides, the centerline from the outlet opening 201*b* to the inlet opening 201*a* is located on the identical great circle of the sphere and the angle between the lines from the center of the inlet opening 201*a* to the diameter of the outlet opening 201*b* is made within 8 degrees.

The integrating sphere 201 is also equipped with a standard white plate 206 that shuts down the outlet opening 201*b* and a detachable light trap 207 that covers the outlet opening 201*b* and standard white plate 206 from outside the integrating sphere 201.

The standard white plate 206 has a uniform high reflectance in entire range of the wavelength of visual light and reflects the incoming light from the inlet opening 201*a* into the inside of the integrating sphere 201. Material having the high reflectance as above includes magnesium oxide, barium sulfate and aluminum oxide. The inside of the integrating sphere 201 is coated with the material having the same reflectance as the standard white plate 206.

A light flux L irradiating the test specimen S must be nearly parallel and no beam shall shift from the light axis by 3 degrees or more. The center of the light flux L shall be aligned to the center of the outlet opening 201*b*. The cross section of the light flux L at the outlet opening 201*b* shall be circular and very clear. Given that the above is met, the angle between the lines from the center of the inlet opening 201*a* to the diameter of the light flux L shall be made smaller than the angle between the lines from the center of the inlet opening 201*a* to the diameter of the outlet opening 201*b* by 1.3±0.1 degree.

When the test specimen S is not mounted on the inlet opening 201*a* or the standard white plate 206 is made open, the light trap 207 absorbs all emitted light completely.

The total sensitivity of the light receptor 205 shall conform to the value Y of the Luther condition (Y of the tristimulus values X, Y, Z) measured by a visual degree filter under standard light C. If particularly specified, however, a receptor that meets the value Y of the Luther condition measured under standard light A may be used.

The test specimen S is a piece cut off from the recording medium in this embodiment into a size suitable for measurement (for example, 50×50 mm, with thickness unchanged from the original). The number of test specimens is preferably three.

How to measure by the integrating sphere type light transmission factor measuring device 200 is explained hereunder. First, the operator shuts up the outlet opening 201*b* with the standard white plate 206 and adjusts the quantity of light from the light source 202 so that the light receptor indicates 100 ($T_1$). Since $T_1$ is set to 100, the quantity of the transmitted light (density) corresponds to the transmission factor.

Then, with the standard white plate 206 being shut, the operator mount the test specimen S on the inlet opening 201*a* and measure the total light transmission factor ($T_2$) of the test specimen S.

After the above, the operator opens the standard white plate 206, removes the test specimen S and mounts the light trap 207, and then measures the quantity of diffused light ($T_3$) by the device.

Finally, with the light trap 207 mounted, the operator mounts the test specimen S and measures the quantity of diffused light ($T_4$) by the device and test specimen S.

After each quantity of light ($T_2$ to $T_4$) is measured, the total light transmission factor $T_t$ (%), diffuse transmission factor $T_d$ (%) and parallel light transmission factor $T_p$ (%) are calculated using the quantities of light.

Formulas for calculating the total light transmission factor $T_t$ (%), diffuse transmission factor $T_d$ (%) and parallel light transmission factor $T_p$ (%) are: $T_t=T_2$, $T_d=(T_4-T_3)\times(T_2/100)$, $T_p=T_t-T_d$. Each total light transmission factor $T_t$ (%), diffuse transmission factor Td (%) and parallel light transmission factor $T_p$ (%) shall be calculated down to the first decimal place.

Then, the diffuse transmission density, Q factor and haze H are calculated from the formulas: ($D_d=-\log(T_t/100)$, $D_p=-\log(T_p/100)$, $Q=D_p/D_d$, H (%)$=T_d/T_t\times100$.

Figure 3:
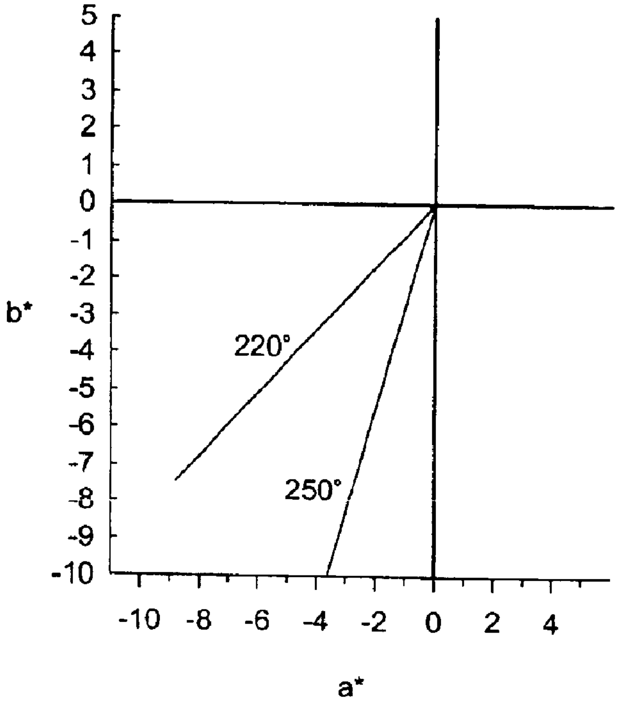
FIG. 3 shows a diagram showing the a*–b* curve that represents the phase angle of the recording medium according to an embodiment of the invention.

For the recording medium, which are formed so that the diffuse transmission density, Q factor and haze fall within the range shown above, it is preferable that, when light from a F6 or F10 fluorescent light source specified by JIS is transmitted through a fresh recording medium on which no image has been generated, the hab (psychological hue angle defined by the CIELAB color specification: hab=$\tan^{-1}$(b*/a*)) is in a range from 230 degrees to 250 degrees, both inclusive, (FIG. 3) and $(a^{*2}+b^{*2})^{0.5}$ is in a range from 15 to 22, both inclusive. Because of the above, the background (no-image portion) of the recording medium after generating an image stays in blue and so dazzling due to the transmitted light is prevented and a generated image suitable for observation can be displayed. In addition, the image can be displayed in color tone that does not cause fatigue to eyes during observation.

Variables a* and b* described above are defined by the CIELAB color specification recommended by the CIE (Committee of Internationale de l'Eclairage, or International Commission of Illumination): a* is a scale of the red-blue contribution factor and b* is a scale of the yellow-blue contribution factor. hab is the psychological hue angle defined by a formula hab=$\tan^{-1}$(b*/a*). Although values of a*, b* and hab may vary depending upon the spectral property of the light source, in this specification, unless otherwise specified, values of a*, b* and hab are those in the visual field of 2 degrees under F6 fluorescent light source (ordinary type white fluorescent light) or F10 fluorescent light source (three-wavelength-band luminescent type fluorescent light). The spectrum property of each F6 fluorescent light source and F10 fluorescent light source is specified in JIS Z 8719-1996 "Metamerism index: Evaluation method of degree of metamerism for change in illuminant" and the light source has the relative spectrum distribution shown in Table 1.

TABLE 1

| Wavelength λ (nm) | Relative spectrum distribution F6 | F10 | Wavelength λ (nm) | Relative spectrum distribution F6 | F10 | Wavelength λ (nm) | Relative spectrum distribution F6 | F10 |
|---|---|---|---|---|---|---|---|---|
| 380 | 1.05 | 1.11 | 515 | 6.30 | 1.88 | 650 | 4.16 | 3.19 |
| 385 | 1.31 | 0.80 | 520 | 6.60 | 1.59 | 655 | 3.55 | 2.77 |
| 390 | 1.63 | 0.62 | 525 | 7.12 | 1.47 | 660 | 3.02 | 2.29 |
| 395 | 1.90 | 0.57 | 530 | 7.94 | 1.80 | 665 | 2.57 | 2.00 |
| 400 | 3.11 | 1.48 | 535 | 9.07 | 5.71 | 670 | 2.20 | 1.52 |
| 405 | 14.80 | 12.16 | 540 | 10.49 | 40.98 | 675 | 1.87 | 1.35 |
| 410 | 3.43 | 2.12 | 545 | 25.22 | 73.69 | 680 | 1.60 | 1.47 |
| 415 | 3.30 | 2.70 | 550 | 17.46 | 33.61 | 685 | 1.37 | 1.79 |
| 420 | 3.68 | 3.74 | 555 | 15.63 | 8.24 | 690 | 1.29 | 1.74 |
| 425 | 4.07 | 5.14 | 560 | 17.22 | 3.38 | 695 | 1.05 | 1.02 |
| 430 | 4.45 | 6.75 | 565 | 18.53 | 2.47 | 700 | 0.91 | 1.14 |
| 435 | 32.61 | 34.39 | 570 | 19.43 | 2.14 | 705 | 0.81 | 3.32 |
| 440 | 10.74 | 14.86 | 575 | 21.97 | 4.86 | 710 | 0.71 | 4.49 |
| 445 | 5.48 | 10.40 | 580 | 23.01 | 11.45 | 715 | 0.61 | 2.05 |
| 450 | 5.78 | 10.76 | 585 | 19.41 | 14.79 | 720 | 0.54 | 0.49 |
| 455 | 6.03 | 10.67 | 590 | 18.56 | 12.16 | 725 | 0.48 | 0.24 |
| 460 | 6.25 | 10.11 | 595 | 17.42 | 8.97 | 730 | 0.44 | 0.21 |
| 465 | 6.41 | 9.27 | 600 | 16.09 | 6.52 | 735 | 0.43 | 0.21 |
| 470 | 6.52 | 8.29 | 605 | 14.64 | 8.31 | 740 | 0.40 | 0.24 |
| 475 | 6.58 | 7.29 | 610 | 13.15 | 44.12 | 745 | 0.37 | 0.24 |
| 480 | 6.59 | 7.91 | 615 | 11.68 | 34.55 | 750 | 0.38 | 0.21 |
| 485 | 6.56 | 16.64 | 620 | 10.25 | 12.09 | 755 | 0.35 | 0.17 |
| 490 | 5.56 | 16.73 | 625 | 8.95 | 12.15 | 760 | 0.39 | 0.21 |
| 495 | 6.42 | 10.44 | 630 | 7.74 | 10.52 | 765 | 0.41 | 0.22 |
| 500 | 6.28 | 5.94 | 635 | 6.69 | 4.43 | 770 | 0.33 | 0.17 |
| 505 | 6.20 | 3.34 | 640 | 5.71 | 1.95 | 775 | 0.26 | 0.12 |
| 510 | 6.19 | 2.35 | 645 | 4.87 | 2.19 | 780 | 0.21 | 0.09 |

To measure the Q factor of the medium on which an image is so generated that the diffuse transmission density is 1.00, it is necessary to record an image so that the diffuse transmission density is 1.00 throughout a certain area. The area can be of any size so far as the integrating sphere type light transmission factor measuring device shown in FIG. 1 can take measurement. Although a real image used for observation may not always contain an area throughout which the diffuse transmission density is 1.00, it is possible to record multiple test image signals having a constant signal value and measure them for the above purpose. For example, given that the recordable maximum density is $D_{max}$, recordable minimum density is $D_{min}$, and n is an integer from 0 to 10, a test image is so generated and recorded that the density of an image recorded in the n-th square of eleven squares, each with a size of 50 mm by 50 mm, has a specific signal value corresponding to $D_{min}+0.1\times n\times(D_{max}-D_{min})$, and the diffuse transmission density of each square is measured. If a square with the diffuse transmission density of 1.00 is found, measuring the Q factor of the square will do. If no square exhibits the diffuse transmission density of 1.00 exactly, measure the Q factor at a portion where the diffuse transmission density is measured higher but closest to 1.00 and also lower but closest to 1.00, and then calculate the Q factor at the diffuse transmission density of 1.00 by interpolation.

Figure 4:
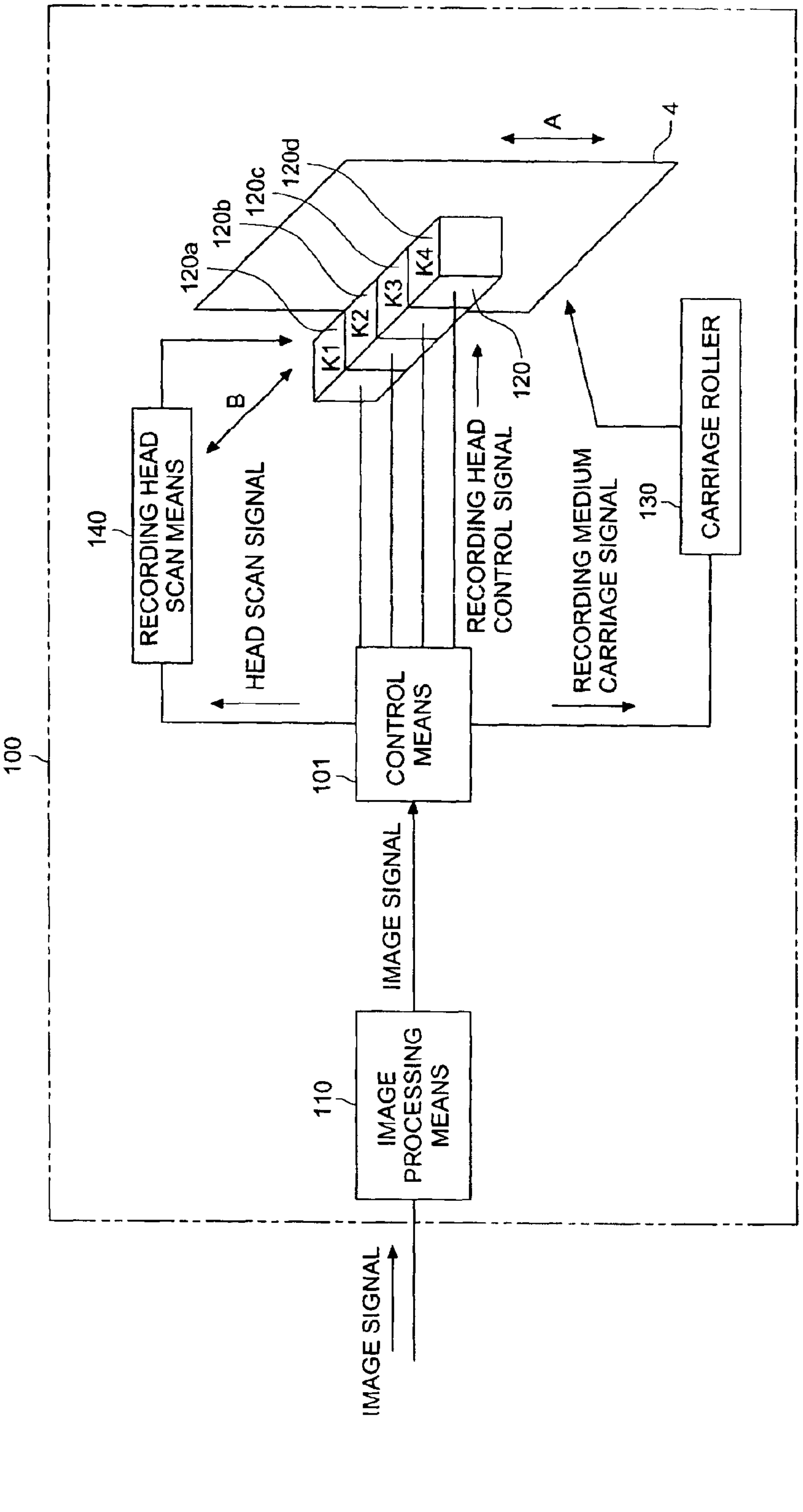
FIG. 4 shows a block diagram showing the main components of the image recording device that generates an image on the recording medium shown in FIG. 3.

Next, an image recording device of the inkjet recording system that generates an image on the inkjet recording medium of the present invention is described hereunder, using FIG. 4.

The image recording device 100 of the present embodiment comprises an image processing means 110 into which image signals are inputted from an external medical photographic device or storage device and which executes necessary image processing; recording head unit 120 which records images on a recording medium 4 by ink emission; recording head scanning means 140 that scans the recording head unit in the main scan direction; carriage roller 130 that carries the recording medium 4 in the sub scan direction; and control means 101 that controls each portion of the device.

Besides, an image signal inputted into image-processing means 110 from an external device may be sent via a network of various types. The image signal processed and obtained by the image processing means 110 is sent to the image control means 101.

The recording head unit 120 is equipped with four recording heads 120*a* to 120*d* in series for black ink K1 to K4 of different density, respectively, and a recording head control signal is supplied from the control means 101 to each of them. These recording heads 120*a* to 120*d* may be integrated or installed separately. Generating an image using four different types of ink as above enables to obtain higher quality and better multi-gradation as an image used for medical diagnosis or reference. To generate an image for medical use that is required to have multi-gradation, it is preferable to use three to four kinds of ink of different density.

The ink emission mechanism of the ink-jet head may be an ink-jet type that utilizes the piezo electric effect or utilizes a bubble forming force generated at the time when the ink is heated momentarily. The number of nozzle holes suitable for an ink-jet type for medical application is about 64 to 512. The traveling speed of ink particles is preferably 2 to 20 m/s and the amount of ink particles per emitted drop is preferable 1 to 50 pico litter.

Numeral 130 indicates a carriage roller that carries the recording medium 4 in a direction indicated by arrow A, based on the recording medium conveying signal.

Numeral 140 indicates a recording head carriage means that carries the recording head unit 120 in a direction perpendicular to the carriage direction of the recording medium 4 by means of carriage roller 130 so as to scan in the direction indicated by arrow B.

The recording head carriage means 140 moves the recording head unit 120 in the arrow B direction according to the head carriage signal. Each of the recording heads 120*a* to 120*d* generates an image on the recording medium 4 based on the recording head control signal. To the control means 101, an image signal is sent from the image processing means 110, and to the image processing means 110, an image signal is inputted from an external photographing device or storage device. Input to the image processing means may be sent via a network.

In this embodiment, the recording heads 120*a* to 120*d* of an inkjet system, which are a means for emitting multiple inks independently, are used to emit multiple inks of different tone and generate an image.

Besides, it is preferable that the recording heads 120*a* to 120*d* of an inkjet system are used to emit multiple monocolor inks of different density to generate an image, because a high-quality image is obtained. That is, each of the recording heads 120*a* to 120*d* is used for each of multiple mono-color inks of different density levels, for example, two levels, three levels, or four levels, respectively, and an image is recorded using different inks independently or in combination. For generating a monochrome image, for example, black inks K1 to K4 can be used.

For generating a color image, each recording head 120*a* to 120*d* is used separately for, for example, yellow (Y), magenta (M), cyan (C), and black (K).

Ink used in this embodiment can be fused with appropriate coloring material. Coloring material can be either pigment or dye. A single kind alone or a combination of multiple kinds of pigment of dye can be used, or it is also allowable to use them in mixture.

For example, carbon black pigment is used and ethylene glycol, surface active agent or antiseptic agent is mixed to produce water-soluble black ink that is in a liquid form and under normal temperature.

Applicable pigment, other than the carbon black pigment, is any known organic or inorganic pigment. For example, inorganic pigment includes azo pigment such as azolake, insoluble azo pigment, condensed azo pigment, and chelate azo pigment, polycyclic pigment such as phthalocyanine pigment, perylene and perylene pigment, anthraxquinone pigment, quinaklydone pigment, dioxanezene pigment, thioindigo pigment, isoindolinone pigment, and quinophthaloni pigment, dye lake such as basic dye type lake and acid dye type lake, and nitro pigment, nitroso pigment, aniline black, and daylight fluorescent pigment.

Applicable equipment for dispersing the pigment includes ball mill, sand mill, Atlighter, roll mill, agitator, Henschell mixer, colloid mill, ultrasonic homogenizer, purl mill, wet jet mill, and paint shaker. While dispersing the pigment, dispersing agent can also be added. Applicable dispersing agent includes anion type or nonion type surface active agent, and polymer dispersing agent.

Dye can be either water-soluble dye or oil-soluble dye.

Water-soluble dye includes, for example, acid dye, basic dye, and reactive dye.

Applicable black dye includes, for example, CI (color index) Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199.

When inks of different tone are employed, Acid Blue 9, Acid Red 52 or 94, Acid Yellow 23, Direct Yellow 86 or 142 is used as coloring material. Besides, for example, use of an ink disclosed in the Japanese Application Patent Laid-open Publication No. 2000-129182 is also preferable in this embodiment.

Applicable water-soluble organic solvent includes alcohol group (for example, alcohols (for example, methanol, ethanol, isopropanol, butanol, isobutanol, secondarybutanol, tertiarybutanol, pentanol, hexanol, cyclohexanol, and benzyl alcohol), polyatomic alcohol group (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol) polyatomic alcohol ether group (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amine group (for example, ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyl diethylene triamine, and tetramethyl propylene diamine), amide group (for example, form amide, N,N-dimethyl form amido, N,N-dimethyl acetoamide), hetrocyclic group (for example, 2-pyrolidone, N-methyl-2-pyrolidone, cyclohexyl pyrolidone, 2-oxazolidone, and 1,3-dimethyl-2-imida zolidinone), sulfoxid group (for example, dimethyl sulfoxid), sulfone group (for example, sulfolane), urea, acetonitril, and acetone.

Surface active agent may be added to ink, as needed. Favorable surface active agent for ink includes anionic surface active agent such as dialkyl-sulfo succinic acid, alkyl naphthalene sulfonate, and fat acid salt, nonionic surface active agent such as polyoxy-ethylene alkyl ether, polyoxiethylene allyl ether, acetylene glycol, and polyoxypropylene block copolymer, and cationic surface active agent such as alkyl amine salt and Class-4 ammonium salt.

In addition to the above, other materials such as mildew preventing agent, pH conditioning agent, and viscosity conditioning agent can be added to the ink, as needed.

In order to let the Q factor fall within the range specified in the present invention, it is preferable that the coloring material has penetrated into the ink absorbing layer. Since dye penetrates more easily into the ink absorbing layer than pigment, dye ink is more preferable in this regard. On the other hand, pigment ink is more preferable in view of advantageous image storage because it is chemically more stable.

[Embodiment]

Preferred embodiments of the present invention are described hereunder, using examples, but the embodiment of the invention is not limited thereto.

[Producing Recording Medium]

[Production of Supporting Base 1]

To produce supporting base 1, 100 parts of 2,6-naphthalene di-carbonic acid dimethyl-ester and 60 parts of ethylene glycol are reacted to cause ester exchange in a regular process, using 0.03 part (1.23 mol) of cobalt acetate 4 water-salt as the ester exchange catalyst, and after adding 0.023 part (1.64 mol) of trimethyl phosphate and also adding 0.024 part (0.82 mol) of antimony trioxide, they are subjected to condensation polymerization under continuous high temperature and high vacuum in a regular process to produce polyethylene naphthalate having the specific viscosity (when measured at 35° C. using phenol/tetra chloroethane mixed solution) of 0.60 dl/g. Pellet of this polyethylene naphthalate is dried at 180° C. for 3 hours, and then fed into an extruder hopper and melted at a melting temperature of 300° C. Then, this melted polymer is extruded through a slit die of 2 mm wide onto a rotary cooling drum with its surface temperature of 40° C. to produce raw film. The raw film produced as above is then preheated at 120° C. and then heated, between the low-speed and high-speed rollers, from 15 mm above by an IR heater with its surface temperature of 900° C. and stretched by 3.0 times long. The film is then fed into a stentor and stretched at 140° C. by 3.2 times long in the lateral direction. The produced biaxial oriented film is thermally fixed at 230° C. for 10 seconds to produce polyethylene naphthalate biaxial oriented film with a thickness of 175 μm. This biaxial oriented film is then heat treated at 115° C. for 2 days.

[Production of Supporting Bases 2 and 3]

Supporting base 2 is produced in the same processes as for the supporting base 1 except that dye No. 8 is added by 60 mg/m$^2$ before the condensation polymerization. Then, supporting base 3 is produced in the same processes as for the supporting base 1 except that dye No. 8 is added by 90 mg/m$^2$ before the condensation polymerization. The transmission density of the produced supporting bases 2 and 3 is 0.12 and 0.18, respectively.

One surface of the supporting base 2 is subjected to corona discharge treatment of 8 W.min/m$^2$, and then, the undercoating liquid a-1 specified below is applied on the surface by 10 ml/m$^2$ and dried at 100° C. for 1 minute to generate an undercoat layer A-1. Next, the surface of the undercoat layer A-1 is subjected to corona discharge treatment of 8 W.min/m$^2$, and then, the upper undercoating liquid a-2 specified below is applied on the surface by 10 ml/m$^2$ and dried at 100° C. for 1 minute to generate an upper undercoat layer A-2. Further, the surface opposite to A-2 is subjected to corona discharge treatment of 8 W.min/m$^2$, and then, the undercoating liquid b-1 specified below is applied on the surface by 10 ml/m$^2$ and dried at 100° C. for 1 minute to generate an undercoat layer B-1. Next, the surface of the undercoat layer B-1 is subjected to corona discharge treatment of 8 W.min/m$^2$, and then, the upper undercoating liquid a-2 specified below is applied on the surface by 10 ml/m$^2$ and dried at 100° C. for 1 minute to generate an upper undercoat layer B-2. The double-side undercoated PET film is then heat treated at 140° C. for 2 minutes.

[Preparation of Undercoating Liquid a-1]

| | |
|---|---|
| Copolymer (butyl-acrylate 30 weight %, t-butyl-acrylate 20 weight %, styrene 25 weight %, 2-hydroxy-ethylmethacrylate 25 weight %), latex liquid (solid content 30%) | 270 g |
| C-1 (5% water solution) | 12 g |
| Hexamethylene-1,6 bis (ethylene urea) (20% methanol solution) | 8 g |

All above are put together into pure water to prepare the liquid of total 1000 ml.

[Preparation of Undercoating Liquid b-1]

| | |
|---|---|
| Copolymer (butyl-acrylate 40 weight %, styrene 20 weight %, glycyzil-methacrylate 40 weight %), latex liquid (solid content 30%) | 270 g |
| C-1 (5% water solution) | 12 g |
| Hexamethylene-1,6 bis (ethylene urea) (20% methanol solution) | 8 g |

All above are put together into pure water to prepare the liquid of total 1000 ml.

[Preparation of Upper Undercoating Liquid a-2]

| | |
|---|---|
| Gelatin | 10 g |
| C-1 (5% water solution) | 4 g |
| C-2 (5% water solution) | 4 g |
| C-3 (0.5% water solution) | 20 g |
| C-F | 0.1 g |
| Silica particles with an average particle size of 3 μm (1% water solution) | 100 g |

All above are put together into pure water to prepare the liquid of total 1000 ml.

[Chemical Formula 3]

C-1

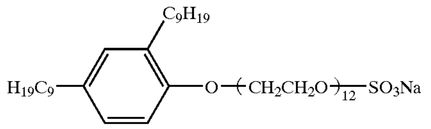

C-2

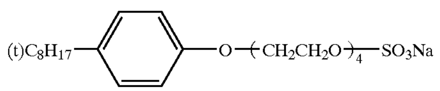

C-3

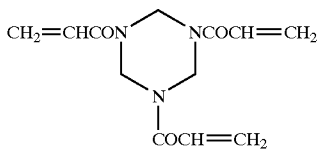

C-F

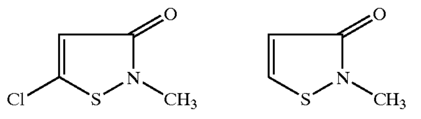

-continued

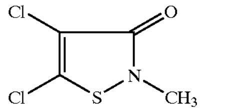

(Mixture)

[Back Coat Layer (BC)]

To generate a back coat layer, the BC coating liquid specified below is applied on the upper undercoat layer A-2 of the produced supporting base so that the dry weight is 2.8 $g/m^2$.

[Preparation of BC Coating Liquid]

35 g of gelatin is added to pure 890 ml of water and swelled, and then heat-melted at 65° C. and the solution is kept under 40° C. Then, 8 ml of matting agent dispersion liquid-1, 6 ml of fluoric surface active agent C-6 (10% water solution) and 15 ml of hardening agent C-4 (7.5% water solution) are added, and all are put together into pure water to prepare the liquid of total 1000 ml.

[Chemical Formula 4]

C-4

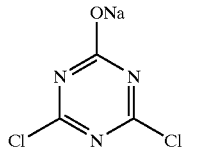

Fluoric surface active agent C-6

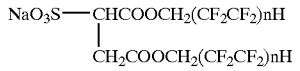

n = 2

[Production of Specimen 1]

On the upper undercoat layer B-2 of the supporting base that has been provided with a back coat layer, the first ink-receptor layer coating liquid specified below is applied in a thickness of 60 μm, the second ink-receptor layer coating liquid is applied in a thickness of 120 μm and the third ink-receptor layer coating liquid is applied in a thickness of 60 μm, in this order starting from the surface of the supporting base, generating multiple layers simultaneously. Each coating liquid is applied by a three-layer slide-hopper coating machine under 40° C. and the coated specimen is then cooled down for 20 seconds in a cooling zone kept at 8° C. Then, it is dried in a wind of 20 to 30° C. for 60 seconds, in a wind of 45° C. for 60 seconds, and in a wind of 50° C. for 60 seconds, sequentially, and then humidity-conditioned under 23° C. with relative humidity of 40 to 60% for 2 minutes. Thus, the inkjet recording medium specimen 1 is produced. The specimen 1 is cut into a half size (431.8 mm×355.6 mm).

Silica dispersion liquid-1 and -2 used in preparing the first, second and third ink-receptor layer coating liquid is each prepared as below, respectively.

<<Preparation of Silica Dispersion Liquid-1>>

125 kg of vapor phase method silica (A300 manufactured by Nihon Aerozir Industries, Ltd.), of which primary particles have a mean particle size of about 0.007 μm, is suction-dispersed into 620 liter of pure water, which is adjusted to pH=2.5 with nitric acid, under room temperature, using a jet-stream inductor mixer TDS manufactured by Mitamura Riken Kogyo, Inc., and a total 694 liter of the silica dispersion liquid-1 is prepared using pure water.

<<Preparation of Silica Dispersion Liquid-2>>

69.4 liter of silica dispersion liquid-1 is mixed into 18 liter of a solution (pH=2.3) containing 1.41 kg of cationic polymer (P-1) and 4.2 liter of ethanol, by stirring with a high-speed homo-mixer, for a duration of 20 minutes under a temperature ranging from 25 to 30° C. Then, a water solution (pH=7.3) containing 260 g of boric acid and 230 g of borax is mixed into it for a duration of about 10 minutes. Further, 1 g of defoaming agent (SN Defoamer 381 manufactured by Sannopco Co., Ltd.) is added. The prepared mixture solution is further stirred at a high speed of 1,500 rpm for another 1 hour, and then subjected to dispersion at a pressure of 24.5 MPa two times, using a high-pressure homogenizer manufactured by Sanwa Industries Co., Ltd., and a total 97 liter of the dispersion liquid is prepared using pure water. The prepared liquid is then filtered through TCP-30 type filter having a filtration accuracy of 30 μm, manufactured by Advantec Toyo Kaisha, Ltd., and almost clear silica dispersion liquid-2 is produced. pH value of the liquid is about 4.2.

[Chemical Formula]

P-1

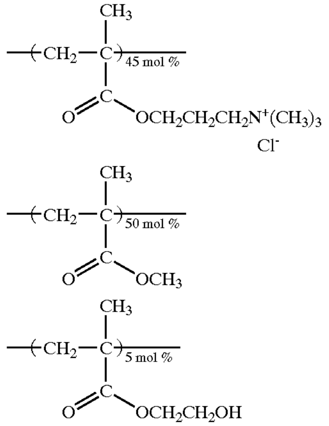

Mw = 15,000

<<Preparation of Coating Liquid>>

The first, second and third ink-receptor layer coating liquids are prepared in the procedures below.

For the first layer coating liquid, the following additives are mixed gradually into 600 ml of the silica dispersion liquid-2 by stirring under 40° C., and a total 1000 ml is prepared using pure water.

(1) Polyvinyl alcohol (PVA235, average degree of polymerization: 3500) (manufactured by Kuraray Industries, Ltd.) 7% water solution: 194.6 ml (2) Latex emersion AE-803 (manufactured by Dai-ichi Kogyo Co., Ltd.): 18 ml pH value of this coating liquid is about 4.4.

For the second layer coating liquid, the following additives are mixed gradually into 650 ml of the silica dispersion liquid-2 by stirring under 40° C., and a total 1000 ml is prepared using pure water.

(1) Polyvinyl alcohol (PVA235, average degree of polymerization: 3500) (manufactured by Kuraray Industries, Ltd.) 7% water solution: 201.6 ml (2) Discoloration preventing agent-1 5% water solution: 20 ml pH value of this coating liquid is about 4.4.5% water solution of the discoloration preventing agent-1 is prepared as follows: 5 g of N,N-di-sulfoethyl hydroxylamine-2 sodium salt is dissolved into 90 ml of water containing 3 g of cationic polymer (P-13), and a total 100 ml is prepared using pure water.

For the third layer coating liquid, the following additives are mixed gradually one after another into 650 ml of the silica dispersion liquid-2 by stirring under 40° C., and a total 1000 ml is prepared using pure water.

(1) Polyvinyl alcohol (PVA235, average degree of polymerization: 3500) (manufactured by Kuraray Industries, Ltd.) 7% water solution: 201.6 ml (2) Silicone dispersion liquid (BY-22-839 manufactured by Dow Corning Toray Silicone Co., Ltd.): 15 ml (3) Saponine 50% water solution: 4 ml (4) Matting agent dispersion liquid-2: 20 ml pH value of this coating liquid is about 4.5.

The coating liquid prepared as above is filtered by a filter specified below.

The first layer coating liquid and second layer coating liquid are each filtered through two stages of TCP10 manufactured by Toyo Roshi Kaisha, Ltd. The third layer coating liquid is filtered through two stages of TCP30 manufactured by Toyo Roshi Kaisha, Ltd.

The matting agent dispersion liquid-1 is MX700 (average particle size of 7 μm, monodispersed acryl particles: manufactured by Soken Chemical Co., Ltd.). The matting agent dispersion liquid-2 is MX1500 (average particle size of 15 μm, monodispersed acryl particles: manufactured by Soken Chemical Co., Ltd.). Solid content in each matting agent dispersion liquid-1 and -2 is 10 weight %.

<Specimen 2>

Specimen 2 is produced in the same procedure as for the specimen 1 except that, in preparing the silica dispersion liquid-1, 125 kg of vapor phase method silica (A200 manufactured by Nihon Aerozir Industries, Ltd.), of which primary particles have a mean particle size of about 0.012 μm, is suction-dispersed into 620 liter of pure water, which is adjusted to pH=2.8 with nitric acid, under room temperature, using a jet-stream inductor mixer TDS manufactured by Mitamura Riken Kogyo, Inc., and a total 694 liter is prepared using pure water.

<Specimen 3>

Specimen 3 is prepared in the same procedure as for the specimen 1 except that, in preparing the third layer coating liquid, matting agent dispersion liquid-2 is not added.

<Specimen 4>

Specimen 4 is prepared in the same procedure as for the specimen 2 except that, in preparing the third layer coating liquid, matting agent dispersion liquid-2 is not added.

<Specimen 5>

Specimen 5 is produced in the same procedure as for the specimen 3 except that, in preparing the silica dispersion liquid-1, 125 kg of vapor phase method silica (A380 manufactured by Nihon Aerozir Industries, Ltd.), of which primary particles have a mean particle size of about 0.006 μm, is suction-dispersed into 620 liter of pure water, which is adjusted to pH=2.4 with nitric acid, under room temperature, using a jet-stream inductor mixer TDS manufactured by Mitamura Riken Kogyo, Inc., and a total 694 liter is prepared using pure water.

<Specimen 6>

Specimen 6 is prepared in the same procedure as for the specimen 5 except that the supporting base 3 is used instead of the supporting base 2.

<Specimen 7>

Specimen 7 is prepared in the same procedure as for the specimen 1 except that the supporting base 1 is used instead of the supporting base 2 and dye No. 7 is added to the BC coating liquid.

<Production of Image for Evaluation>

Coloring material solution (18.9 g of direct black 154, 30 g of ethylene-glycol, 4 g of triethylene-glycol, and 41.3 g of pure water) and thinning solution (30 g of ethylene-glycol, 14.2 g of triethylene-glycol, and 55.6 g of pure water) are mixed differently to produce four kinds of ink with different density.

An on-demand type inkjet printer is manufactured for testing. The printer, equipped with total four inkjet heads, each having 256 nozzles of a nozzle hole diameter of 24 μm, corresponding to the above four kinds of ink, can emit ink in particles of 7 pico-liter at a drive frequency of 12 kHz and ink emission speed of 6 m/sec at a density of 1440 dots/25.4 mm (recording density: number of dots per 2.54 cm).

A radiographic front image of breast is taken by CR (computed radiography) system REGIUS Model 150 manufactured by Konica Corporation. Image is printed on each specimen 1 to 7, based on the digital signal representing the radiographic front image of breast and the test image signal comprising the aforementioned eleven squares, by the inkjet printer above. Each print is called embodiment example 1 to 7.

On each embodiment example 1 to 7, the Q factor and haze can be maintained within a specified range because foams in each liquid is sufficiently removed through the processes as described above, including suction dispersion in preparing the silica dispersion liquid-1, high-speed stirring at 1500 rpm for 1 hour in preparing the silica dispersion liquid-2, and two-stage filtration in preparing the coating liquid.

Besides, the Q factor and haze can be made smaller when the average particle size of the primary particles of vapor phase method silica is smaller.

The Q factor and haze can also be made smaller when the ink absorbing layer contains no matting agent. In this case, smooth carriage of the recording medium can be ensured by adding matting agent onto the back coat layer opposite to the ink absorbing layer.

COMPARATIVE EXAMPLE

The same procedure as for the specimen 1 is followed until a supporting base provided with the back coat layer is obtained.

The ink-receptor layer coating liquid as specified below is applied, in a film thickness of 240 μm, on the upper undercoating layer B-2 of the supporting base provided with the back coat layer. After this, the supporting base is cooled down for 20 seconds in a cooling zone kept at 0° C. Then, it is dried in a wind of 40° C. for 150 seconds, and an inkjet recording medium specimen 8 is produced.

Silica dispersion liquid-3 and -4 used in preparing the ink-receptor layer coating liquid is each prepared as follows.

<<Preparation of Silica Dispersion Liquid-3>>

180 g of vapor phase method silica (A300 manufactured by Nihon Aerozir Industries, Ltd.), of which primary particles have a mean particle size of about 0.007 μm, is dispersed into 1000 liter of pure water, which is adjusted to pH=2.5 with nitric acid, using a high-pressure homogenizer manufactured by Sanwa Industries Co., Ltd., and the silica dispersion liquid-3 is prepared.

<<Preparation of Silica Dispersion Liquid-4>>

Then, 100 ml of Mor-1 25% water solution is added, as cationic polyer, into the silica dispersion liquid-3 and the defoaming agent SN381 manufactured by Sunnopco Co., Ltd. is added by 0.01% of the coating liquid. Then, the solution is dispersed by the high-speed homogenizer for 30 minutes, and blue-white transparent dispersion liquid is prepared. Then, 1 ml of 10% polyvinyl alcohol-water solution having the mean polymerization degree of 300 and saponification degree of 98% is added; 600 ml of 5% polyvinyl alcohol-water solution (containing ethyl acetate by 4 weight %) having the mean polymerization degree of 3500 and saponification degree of 95% is added gradually; then, 100 ml of 4% borax water solution is added as viscosity improver; and further, 20 ml of ethanol is added. Then, 30 ml of the dispersion material specified below is added into the liquid and the coating liquid for forming void layer is prepared.

[Chemical Formula 6]

Mor-1

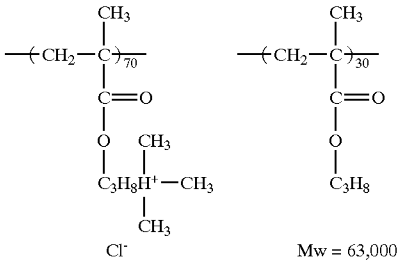

Mw = 63,000

To prepare the dispersion material, solution 1 and solution 2 having the following composition are prepared, and then mixed and dispersed by an ultrasonic dispersing machine.

| | |
|---|---|
| Solution 1 | |
| di-i-decylphthalate | 3.0 g |
| Ethyl acetate | 5 ml |
| Solution 2 | |
| Gelatin | 1.0 g |
| Surface active agent (QC-100 manufactured by Maruzen Pharmaceutical Co., Ltd.) | 2.8 g |
| Pure water | 22 ml |

<Generation of Image for Evaluation>

Image is printed on the specimen 8, based on the aforementioned radiographic front image of breast and the aforementioned digital signal representing the test image signal comprising the eleven squares, by the inkjet printer. The print is called the comparative example 1.

After connecting two inkjet OHP films (Type CF-102, A4 size, swelling type ink receptor), manufactured by Canon Corporation, into A3 size, another image is printed on the film, based on the radiographic front image of breast and the digital signal representing the test image signal comprising the eleven squares, by the inkjet printer. The print is called the comparative example 2.

Another image is printed on a half-size film of wet silver-salt imager Li-62P manufactured by Konica Corporation, based on the radiographic front image of breast and the digital signal representing the test image signal comprising the eleven squares. The print is called the comparative example 3.

Another image is printed on a half-size film of dry silver-salt imager DRYPRO 722 manufactured by Konica Corporation, based on the radiographic front image of breast and the digital signal representing the test image signal comprising the eleven squares. The print is called the comparative example 4.

[Comparative Evaluation]

Using the test images on the embodiment examples 1 to 7 and comparative examples 1 to 4, the diffuse transmission density, Q factor, haze, hab and $(a^{*2}+b^{*2})^{0.5}$ of no-image portion are measured and also the Q factor of an image portion of which diffuse transmission density is 1.00 is measured, both by the method described previously. In addition, the radiographic front images of breast on the embodiment examples 1 to 7 and comparative examples 1 to 4 are visually evaluated with regard to the following and compared with each other.

TABLE 2

| | No-image portion | | | | | | | | Diffuse trans-mission density 1.00 | | Evaluation | | | | |
|---|---|---|---|---|---|---|---|---|---|---|---|---|---|---|---|
| | *3 | *4 1 | Q factor | *4 2 | *4 3 | Haze | *4 4 | *4 5 | Q factor | *4 6 | *7 1 | *7 2 | *7 3 | *7 4 | Total evaluation |
| *1 1 | 0.18 | *5 | 1.35 | *5 | *6 | 13.6 | *5 | *5 | 1.14 | *5 | 2 | 3 | 2 | 2 | 9 |
| *1 2 | 0.19 | *5 | 1.38 | *5 | *6 | 16.6 | *6 | *5 | 1.17 | *5 | 2 | 3 | 2 | 1 | 8 |
| *1 3 | 0.18 | *5 | 1.24 | *5 | *5 | 10.1 | *5 | *5 | 1.09 | *5 | 3 | 2 | 2 | 3 | 10 |
| *1 4 | 0.18 | *5 | 1.39 | *5 | *6 | 12.9 | *5 | *5 | 1.15 | *5 | 2 | 3 | 2 | 2 | 9 |
| *1 5 | 0.16 | *5 | 1.22 | *5 | *5 | 7.9 | *5 | *5 | 1.04 | *5 | 3 | 2 | 2 | 3 | 10 |
| *1 6 | 0.22 | *5 | 1.20 | *5 | *5 | 9.5 | *5 | *5 | 1.07 | *5 | 3 | 2 | 2 | 3 | 10 |
| *1 | 0.18 | *5 | 1.36 | *5 | *6 | 13.5 | *5 | *5 | 1.15 | *5 | 2 | 3 | 2 | 2 | 9 |

TABLE 2-continued

| | No-image portion | | | | | | | | Diffuse transmission density 1.00 | | Evaluation | | | | |
|---|---|---|---|---|---|---|---|---|---|---|---|---|---|---|---|
| | *3 | *4 1 | Q factor | *4 2 | *4 3 | Haze | *4 4 | *4 5 | Q factor | *4 6 | *7 1 | *7 2 | *7 3 | *7 4 | Total evaluation |
| 7 | | | | | | | | | | | | | | | |
| *2 1 | 0.17 | *5 | 1.21 | *5 | *5 | 8.2 | *5 | *6 | 1.31 | *6 | 0 | 1 | 3 | 3 | 7 |
| *2 2 | 0.22 | *5 | 1.55 | *6 | *6 | 25.2 | *6 | *5 | 1.35 | *6 | 0 | 2 | 0 | 1 | 3 |
| *2 3 | 0.03 | *6 | 2.29 | *6 | *6 | 9.8 | *5 | *6 | 1.06 | *5 | 0 | 0 | 0 | 0 | 0 |
| *2 4 | 0.16 | *5 | 2.19 | *6 | *6 | 35.9 | *6 | *5 | 1.18 | *6 | 1 | 2 | 0 | 0 | 3 |

*1; Embodiment example
*2; Comparative example
*3; Diffuse transmission density
*4; Pre-condition *5; in-range
*6; over-range
*7; Evaluation Under the precondition 1, whether the diffuse transmission density of the no-image portion is within a range from 0.15 to 0.45, both inclusive, is judged, and "in-range" means that the density is within the range and "over-range" means that the density is out of the range.

Under the precondition 2, whether the Q factor of the no-image portion is within a range from 1.00 to 1.50, both inclusive, is judged, and "in-range" means that the density is within the range and "over-range" means that the density is out of the range.

Under the precondition 3, whether the Q factor of the no-image portion is within a range from 1.00 to 1.30, both inclusive, is judged, and "in-range" means that the density is within the range and "over-range" means that the density is out of the range.

Under the precondition 4, whether the haze of the no-image portion is within a range from 5% to 15%, both inclusive, is judged, and "in-range" means that the density is within the range and "over-range" means that the density is out of the range.

Under the precondition 5, whether the hab of the no-image portion is within a range from 230 degrees to 250 degrees, both inclusive, and also whether $(a^{*2}+b^{*2})^{0.5}$ is within a range from 15 to 22, both inclusive, is judged, and "in-range" means that the density is within the range and "over-range" means that the density is out of the range.

Under the precondition 6, whether the Q factor of the portion of which diffuse transmission density is nearly 1.00 is within a range from 1.00 to 1.20, both inclusive, is judged, and "in-range" means that the density is within the range and "over-range" means that the density is out of the range.

Description of each evaluation is given hereunder.

Evaluation 1 is to evaluate in four grade as to whether the image density can be seen the same in a case where each image put on two different light boxes is observed and in a case where each image is observed through glass window in white background. Evaluation criterion is: 3: the density is seen almost the same and observed similarly in any condition, 2: the density is seen almost the same and observed similarly at least in the two observation conditions, 1: the density is seen differently in each condition but the difference is within an allowable range, and 0: the density is seen differently and images cannot be regarded as prints from the same data.

Evaluation 2 is to evaluate in four grades mainly with regard to dazzle due to low density in a case where each image put on a light box is observed. Evaluation criterion is: 3: most appropriate quantity of transmitted light is observed, which is very much suitable for diagnosis, 2: appropriate quantity of transmitted light is observed, which is suitable for diagnosis, 1: relatively dazzling but possible to use for diagnosis, 0: too much dazzling to use for diagnosis.

Evaluation 3 is to evaluate in three grades as to how clearly blood tubes are depicted mainly on low-density portion. Evaluation criterion is: 3: very well depicted, 2: well depicted, 0: badly depicted.

Evaluation 4 is to evaluate in four grades with regard to image tone mainly in low-density portion in a case where each put on a light box is observed. Evaluation criterion is: 3: most suitable for diagnosis, 2: yellowish tone is hardly remarkable, and suitable for diagnosis, 1: yellowish tone is remarkable but can be used for diagnosis, 0: yellowish tone is too remarkable and not suitable for diagnosis.

<Total Evaluation>

The score marked in each evaluation item as described above is summed up for total evaluation. Any one of the embodiment examples 1 to 7 have marked the total evaluation of 8 or higher and it is confirmed that the result is better than the total evaluation of the comparative examples 1 to 4.

According to the present invention, yellowing fogging due to light diffusion can be eliminated and even a portion of an image that has lower image density after being generated can be displayed in favorable tone, and also the image can be displayed in a stable density gradation irrespective of the diffusion condition of the light source for observation. Because of this, images suitable for observation can be displayed without wet development processing.

Besides, clear display is possible even on a portion with lower density, and hence diagnostic capability improves.

Disclosed embodiments can be varied by a skilled person without departing from the spirit and scope of the invention.

What is claimed is:

1. A recording medium, being substantially transparent, for recording an image through image-forming processes employing an ink-jetting method, comprising:

a supporting base shaped in a sheet; and an ink-absorbing layer that is formed on at least one of both sides of said supporting base, and that absorbs ink particles so as to form said image;

wherein a diffuse transmission density of a first area, being a part of said recording medium on which no image is formed, is in a range of 0.45–0.15, and a Q-factor of said first area is in a range of 1.50–1.00; and wherein said recording medium is so constituted that a Q-factor of a second area, being a part of said recording medium on which an image is formed so as to adjust a diffuse transmission density at 1.00, is in a range of 1.20–1.00.

2. The recording medium of claim 1, wherein said supporting base is made of a resin material.

3. The recording medium of claim 1, wherein said recording medium is so constituted that a Q-factor of a third area, being a part of said recording medium on which an image is formed so as to adjust a diffuse transmission density at a value smaller than 1.00 and greater than said diffuse transmission density of said first area, is in a range of 1.50–1.00.

4. The recording medium of claim 1, wherein said recording medium is so constituted that said Q-factor of said first area is in a range of 1.30–1.00.

5. The recording medium of claim 4, wherein said recording medium is so constituted that a Q-factor of a third area, being a part of said recording medium on which an image is formed so as to adjust a diffuse transmission density at a value smaller than 1.00 and greater than said diffuse transmission density of said first area, is in a range of 1.30–1.00.

6. The recording medium of claim 1, wherein a haze of said first area is in a range of 15%–5%.

7. The recording medium of claim 1, wherein a psychological hue angle, denoted by hab and defined in the CIE•LAB color system by an equation of $$hab=\tan^{-1}(b^*/a^*),$$

is in a range of 250°–230°, when light, emitted from a fluorescent light-source, transmit through said first area, and wherein a value of $(a^{*2}+b^{*2})^{0.5}$ is in a range of 22–15.

8. The recording medium of claim 1, wherein said ink-absorbing layer is an air-gap type ink-absorbing layer, mainly composed of a high-polymer binder, inorganic micro-particles and/or organic micro-particles.

9. The recording medium of claim 8, wherein an average particle-diameter of said inorganic micro-particles and/or said organic micro-particles before condensing them is equal to or smaller than 15 nm.

10. The recording medium of claim 1, wherein a thickness of said ink-absorbing layer is in a range of 50 $\mu$m–20 $\mu$m.

11. The recording medium of claim 1, wherein said ink-jetting method employs three kinds of black inks, densities of which are different relative to each other, so as to record a medical image.

12. A method for recording a medical image onto a recording medium, being substantially transparent, which comprises a supporting base shaped in a sheet and an ink-absorbing layer, formed on at least one of both sides of said supporting base and absorbing ink particles so as to form said medical image, said method comprising the step of:

forming said medical image onto said recording medium through image-forming processes employing an ink-jetting method;

wherein a diffuse transmission density of a first area, being a part of said recording medium on which no image is formed, is in a range of 0.45–0.15, and a Q-factor of said first area is in a range of 1.50–1.00; and wherein said recording medium is so constituted that a Q-factor of a second area, being a part of said recording medium on which an image is formed so as to adjust a diffuse transmission density at 1.00, is in a range of 1.20–1.00.

13. The method of claim 12, wherein said ink-jetting method employs three kinds of black inks, densities of which are different relative to each other, so as to record said medical image.

14. The method of claim 12, wherein said supporting base is made of a resin material.

15. The method of claim 12, wherein said recording medium is so constituted that a Q-factor of a third area, being a part of said recording medium on which an image is formed so as to adjust a diffuse transmission density at a value smaller than 1.00 and greater than said diffuse transmission density of said first area, is in a range of 1.50–1.00.

16. The method of claim 12, wherein said Q-factor of said first area is in a range of 1.30–1.00.

17. The method of claim 16, wherein said recording medium is so constituted that a Q-factor of a third area, being a part of said recording medium on which an image is formed so as to adjust a diffuse transmission density at a value smaller than 1.00 and greater than said diffuse transmission density of said first area, is in a range of 1.30–1.00.

18. The method of claim 12, wherein a haze of said first area is in a range of 15%–5%.

19. The method of claim 12, wherein a psychological hue angle, denoted by hab and defined in the CIE•LAB color system by an equation of $$hab=\tan^{-1}(b^*/a^*),$$

is in a range of 250°–230°, when light, emitted from a fluorescent light-source, transmit through said first area, and wherein a value of $(a^{*2}+b^{*2})^{0.5}$ is in a range of 22–15.

20. The method of claim 12, wherein a thickness of said ink-absorbing layer is in a range of 50 $\mu$m–20 $\mu$m.

* * * * *